United States Patent [19]
Williams

[11] Patent Number: 5,871,249
[45] Date of Patent: Feb. 16, 1999

[54] STABLE POSITIONING SYSTEM FOR SUSPENDED LOADS

[76] Inventor: John H. Williams, 176 Shamrock Ct., Newberry Park, Calif. 91320

[21] Appl. No.: 747,973

[22] Filed: Nov. 12, 1996

[51] Int. Cl.[6] .............................. B66C 13/04; G01C 19/02
[52] U.S. Cl. ..................... 294/86.41; 294/81.4; 294/905; 74/5.34
[58] Field of Search ...................... 294/1.1, 66.1, 294/66.2, 67.21, 67.5, 81.1, 81.3, 81.4, 81.5, 82.12, 82.15, 86.41, 905; 74/5.22, 5.34, 5.37; 212/256, 272, 273; 414/626, 754

[56] References Cited

U.S. PATENT DOCUMENTS

| | | | |
|---|---|---|---|
| 2,961,877 | 11/1960 | Edwards | 74/5.34 X |
| 2,972,892 | 2/1961 | Tiffany | 74/5.37 |
| 3,210,114 | 10/1965 | Lawton | 294/81.4 |
| 3,327,540 | 6/1967 | Schroeter et al. | 74/5.37 |
| 3,424,401 | 1/1969 | Maurer | 74/5.34 X |
| 3,498,476 | 3/1970 | Mattson et al. | 294/81.4 X |
| 3,517,563 | 6/1970 | Will | 74/5.34 |
| 3,608,384 | 9/1971 | Hardin | 294/81.4 X |
| 3,799,358 | 3/1974 | Putnam | 294/81.4 X |
| 4,020,491 | 4/1977 | Bieser et al. | |
| 4,118,707 | 10/1978 | Yoshida et al. | |
| 4,399,714 | 8/1983 | Barker | |
| 4,442,435 | 4/1984 | Kiryu et al. | |
| 5,207,408 | 5/1993 | Burg | |

FOREIGN PATENT DOCUMENTS

| | | | |
|---|---|---|---|
| 2009847 | 9/1971 | Germany | 294/82.12 |

*Primary Examiner*—Johnny D. Cherry
*Attorney, Agent, or Firm*—Elliott N. Kramsky

[57] ABSTRACT

A stable positioning system for a suspended payload. A stabilizer, control unit and positioner are located above a suspended payload. The stabilizer includes a plurality of flywheels within a casing. The axis of rotation of each flywheel is aligned with one of three orthogonal axes. A central bevel gear translates the output of a high r.p.m. motor to the various flywheels. Four flywheels are arranged into two counterrotating pairs along one horizontal axis. Two flywheels counterrotate about the other axis and a single flywheel rotates about the vertical axis. The mass and arrangement of flywheels provides gyroscopic stability while neutralizing potential precessional moments.

21 Claims, 4 Drawing Sheets

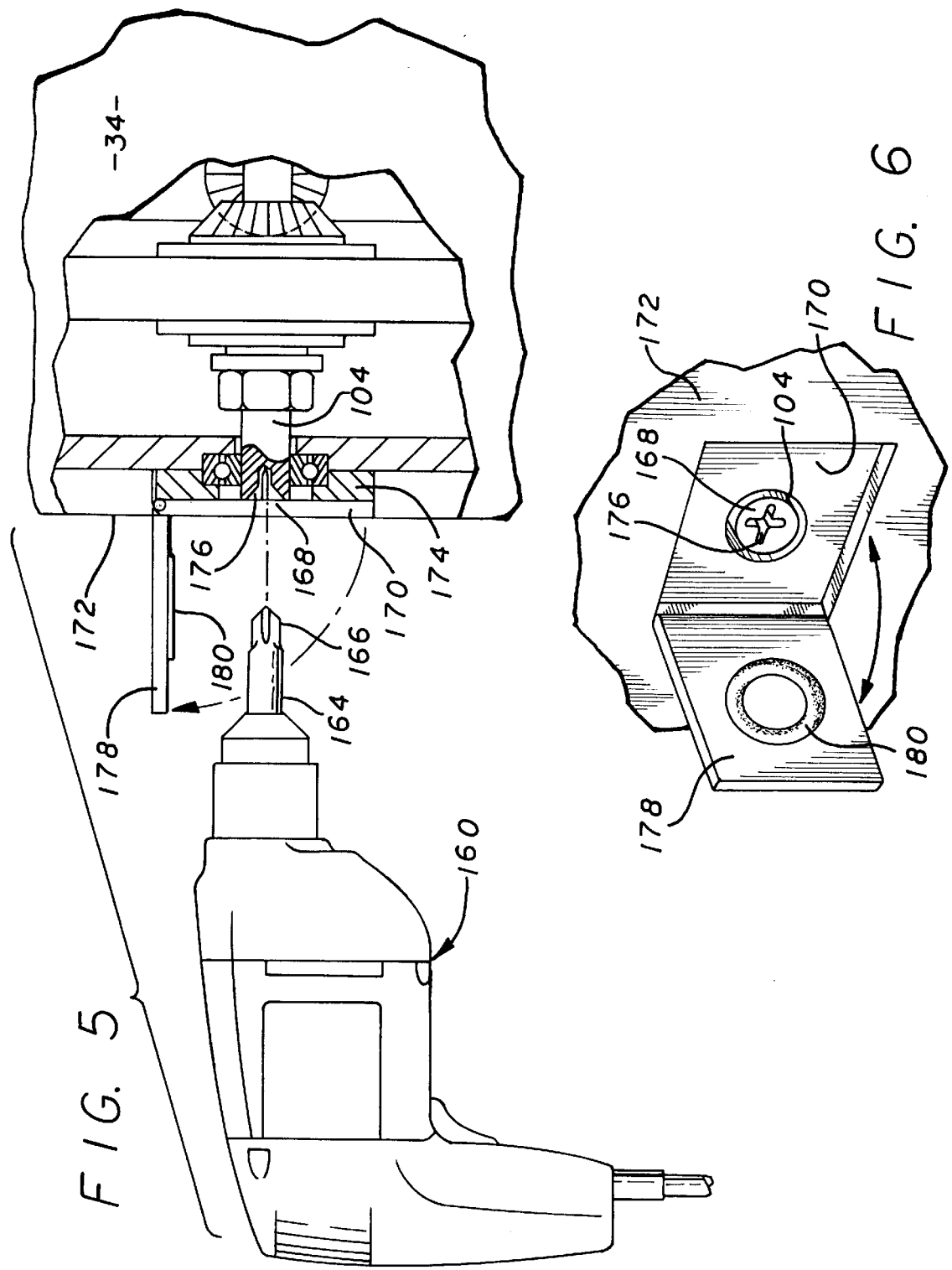

STABLE POSITIONING SYSTEM FOR SUSPENDED LOADS

BACKGROUND

1. Field of the Invention

The present invention relates to apparatus for positioning and controlling a suspended load. More particularly, this invention pertains to a gyroscopically-stabilized positioning system that is resistant to external forces.

2. Description of the Prior Art

Systems in a large number of endeavors employ hoist-and-payload arrangements. For example, I-beams and other structural elements are routinely moved into place while suspended from crane hoists. Cameras and grasping loads ("active" payloads) are lowered into mine shafts and otherwise-inaccessible locations for exploration and to aid in rescue and retrieval of persons and goods. Sea rescue efforts may employ cables suspended from helicopters for lowering rescuers and evacuating victims. Often, a stretcher is mounted at the bottom of the cable and the victim lifted while strapped down.

While hoisted loads enable exploration and rescue efforts from a remote platform, such efforts are often complicated and compromised by the flexible nature of the cable itself. Flexibility permits storage of substantial lengths of cable in limited spaces. However, operations may be compromised by the resultant lack of control over payload position and attitude. Elongated, flexible cables are readily subject to torquing that can result in spinning. Such torsion can be loaded into the cable through buffeting about by such external forces as wind, unintended contact with objects, etc. The very act of boarding a victim onto a stretcher will often produce this. The absence of control over the payload can be dangerous to the victim in the case of rescue efforts and can substantially compromise exploration by means of active suspended payloads.

SUMMARY OF THE INVENTION

The present invention addresses the foregoing and other shortcomings of the prior art by providing apparatus for stabilizing a suspended load. Such apparatus includes means rigidly engaged to the load. Such means includes a plurality of flywheels, each arranged along one of a set of three orthogonal space axes. Means are provided for driving the flywheels. The flywheels are arranged to cancel precession forces generated by individual flywheels in response to external forces.

The preceding and other features of the present invention will be further apparent from the detailed description that follows. Such detailed description is accompanied by a set of drawing figures. Numerals of the drawing figures, corresponding to those of the written description, point to the various features of the invention. Like numerals refer to like features throughout both the written description and the drawing figures.

BRIEF DESCRIPTION OF THE DRAWINGS

FIG. 5 is a side elevation view, partially in section, for illustrating a start-up configuration of the invention whereby a portable drive unit may be employed to initiate the inertial load of the stabilizer; and FIG. 6 is a perspective view of the drive adapter socket and related assemblies of the invention.

DETAILED DESCRIPTION OF THE PREFERRED EMBODIMENT

Figure 1:
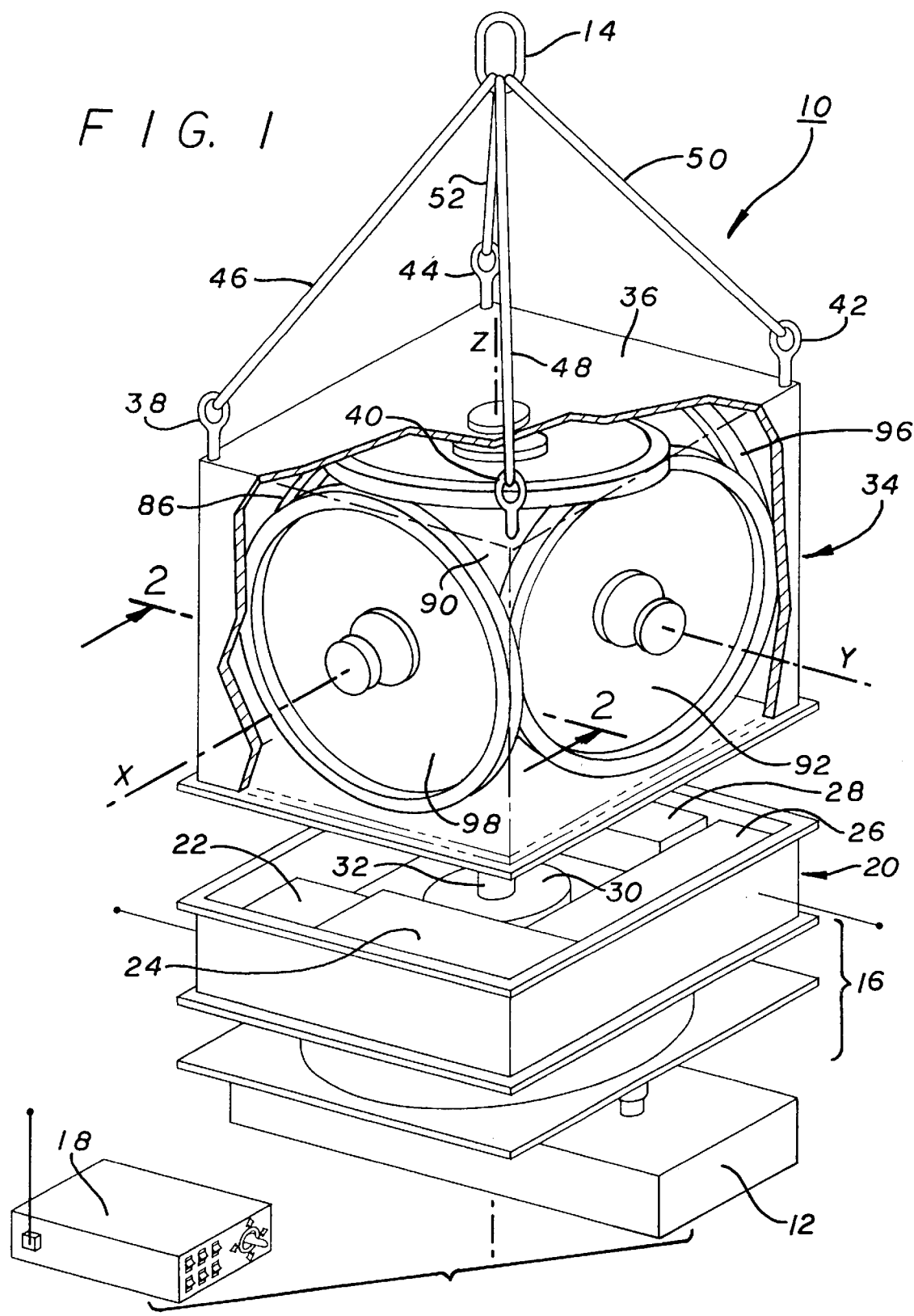
FIG. 1 is a perspective view, partially-broken away, of a stabilized positioning system in accordance with the invention.

FIG. 1 is a perspective view, partially broken away, of a stabilized positioning system 10 in accordance with the invention. The system 10 serves to position and stabilize a payload 12 of either the "active" or "passive" type suspended from a hoist 14. Such a suspended payload 12 is subject to numerous performance-degrading disturbances due to wind and other environmental factors as well as the unavoidable bumping or contact that occurs during "close quarters" operations.

A positioner 16, shown in greater detail in the following figure, permits one to selectively adjust the attitude of the payload 12. The positioner 16 is actuated and remote-controllable through manually-input commands to a transmitter 18. A control unit 20, located above the positioner 16, includes a receiver 22, a case 24 for housing a battery power supply, a signal processor 26 and a power supply 28. A motor 30 is mounted at the center of the control unit 20. The motor 30 drives an output shaft 32 which is geared to actuate the gyroscopic stability provided by an overlying stabilizer unit 34. The drive motor 30 may comprise, for example, a 12-to-28 volt (a.c. or d.c.) input device capable of 0.33 h.p. output with a nominal 15,000 r.p.m. after full run-up based upon a system comprising seven flywheels, each weighing approximately ten pounds. Typically, such a motor will have an efficiency of about eighty percent. The specific design and payload requirements of the system, including size, number and mass of the system flywheels, may dictate either higher or lower operational r.p.m. in accordance with design criteria and practices well known to those skilled in the art. As will be discussed below, particularly in conjunction with FIGS. 5, 6A and 6B, the system is amenable to external means for driving initial run-up, thereby protecting, and limiting the operational requirements placed upon the drive motor 30.

The stabilizer unit 34, positioned above the control unit 20, is housed within a casing 36. The stabilizer casing 36, as well as the control unit 20, are preferably sealed and partially pressurized by means of dry nitrogen via a Schraeder valve, to prevent the intrusion of dust and/or moisture. The upper surface of the casing 36 includes eyelets 38, 40, 42, and 44 for engaging linkages 46, 48, 50, and 52 that ultimately suspend the payload 12 from the hoist 14.

The casing 36 houses an interior arrangement of flywheels. The embodiment illustrated in FIG. 1 and the following figures includes a total of seven (7) such flywheels. Each of such flywheels rotates about one of the three orthogonal axes of rotation indicated as "x" ("pitch axis"), "y" ("roll axis") and "z" ("azimuth"). The invention relies upon the known gyroscopic stability of the axis of rotation of a flywheel. Such stability is a positive function of the size, mass and speed of rotation of the flywheel. In fact, gyroscopic stability is proportional to the square of flywheel radius.

The sizes and masses of the flywheels of the stabilizer unit 34 are chosen to maximize stability. As will be seen below, the arrangement and rotations of the flywheels are such that the stabilizer unit 34 is substantially unaffected by external disturbances and forces that are otherwise capable of inducing precession when a force acts transversely to a flywheel's plane of rotation. Due to its location, at the top of the stacked arrangement of the positioning system 10 wherein the stabilizer unit 34 directly interfaces with the overhead suspension system comprising the hoist 14 and linkages 46, 48, 50 and 52 and is rigidly engaged to the structures below (i.e. control unit 20, positioner 16 and payload 12), this stabilization of space axes serves to stabilize the payload 12 below.

Figure 2:
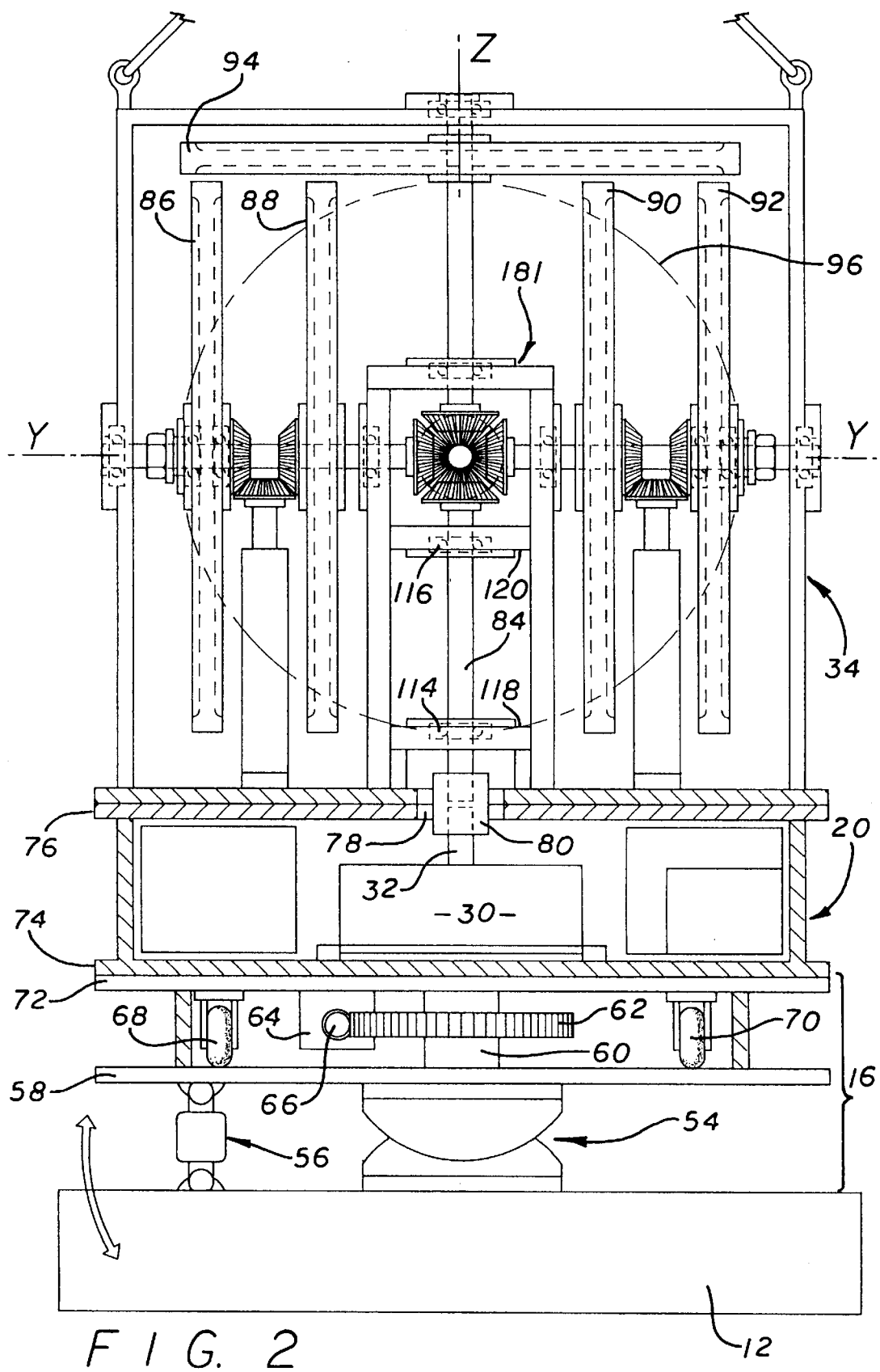
FIG. 2 is a cross-sectional view of the stabilized positioning system of the invention taken generally on line 2—2 of FIG. 1.

FIG. 2 is a cross-sectional view of the stabilized positioning system 10 of the invention taken generally along line 2—2 of FIG. 1. The view of FIG. 2 is taken orthogonal to the x axis and in the y-z plane. Proceeding from the bottom of the arrangement, a ball socket 54 couples the payload 12 to the positioner 16. The positioner 16, as mentioned earlier, is provided for adjusting the attitude of the payload 12 in response to commands from the transmitter 18 to the receiver 22. Mechanisms of the positioner 16 responsive to the commands from the command receiver 22 include a pitch actuator 56 of adjustable height that is responsive to the command receiver 22. A like roll actuator is not shown as it is ninety degrees from the pitch actuator 56 and therefore obscured, in the view of FIG. 2, by the ball socket 54.

A lower shelf 58 supports the upper half of the ball socket 54 and is fixed to a lower shaft 60. The lower shaft 60 is driven by an azimuth drive gear 62, a spur gear responsive to a worm gear 66 driven by an azimuth drive motor 64. The motor 64, in addition to the pitch and roll actuators, is responsive to remote user commands transmitted to the receiver 22. Rollers 68, 70 (in addition to another pair along the orthogonal axis) are fixed to an upper shelf 72 of the positioner 16.

The azimuth mechanisms are partially sealed by means of an encircling weather seal/skirt (not shown) which surrounds the housing. Control unit 20 component and motor cooling is accomplished by d.c.-powered solid state thermoelectric modules (not shown). Lubrication is provided by means of packed, sealed bearings and other existing technologies using synthetic, high temperature lubricants, materials and other means.

The azimuth motor 64, as well as the pitch and roll actuators, is, as mentioned earlier, responsive to signals from the command receiver 22. This allows an operator holding the transmitter 18 to direct a desired orientation of the payload 12 by remote control. In prior art remote-controlled systems, the positioning process is significantly complicated by the difficulty of maintaining a desired payload orientation. Such systems require numerous adjustments on a more-or-less continuous basis to counteract the buffeting about of the payload. The instability of payload orientation thus limits the effectiveness of such systems to tranquil environments that are, of course, rarely encountered. To the contrary, many of the most common uses of payload-suspended systems occur in extremely turbulent environments such as those existing during rescue operations.

Returning to FIG. 2, the upper shelf 72 is bolted or welded to the bottom flange 74 of the control unit 20, thereby fixedly joining the control unit. As mentioned earlier, the casing 20 encloses a power supply 28, a battery case 24 and a command receiver 22. The low voltage (a.c. or d.c.), high speed motor 30 is mounted to the bottom flange 74. The top flange 76 of the control unit 20 includes a central aperture 78 for accommodating a coupling 80 that joins the output shaft 32 of the motor 30 to a vertical shaft 84 that is coupled at its upper end to drive the flywheels of the stabilizer 34 that are located within the casing 36. Rotation of the vertical shaft 84 is translated into counterrotations of flywheels 86, 88, 90 and 92 that are aligned with the "y" or roll axis, rotation of flywheel 94 aligned with the "z" or azimuth axis and counterrotations of flywheels 96 and 98 (the flywheel 98 not being visible in FIG. 2) about the "x" or pitch axis by means of coacting gears, discussed below.

Figure 3:
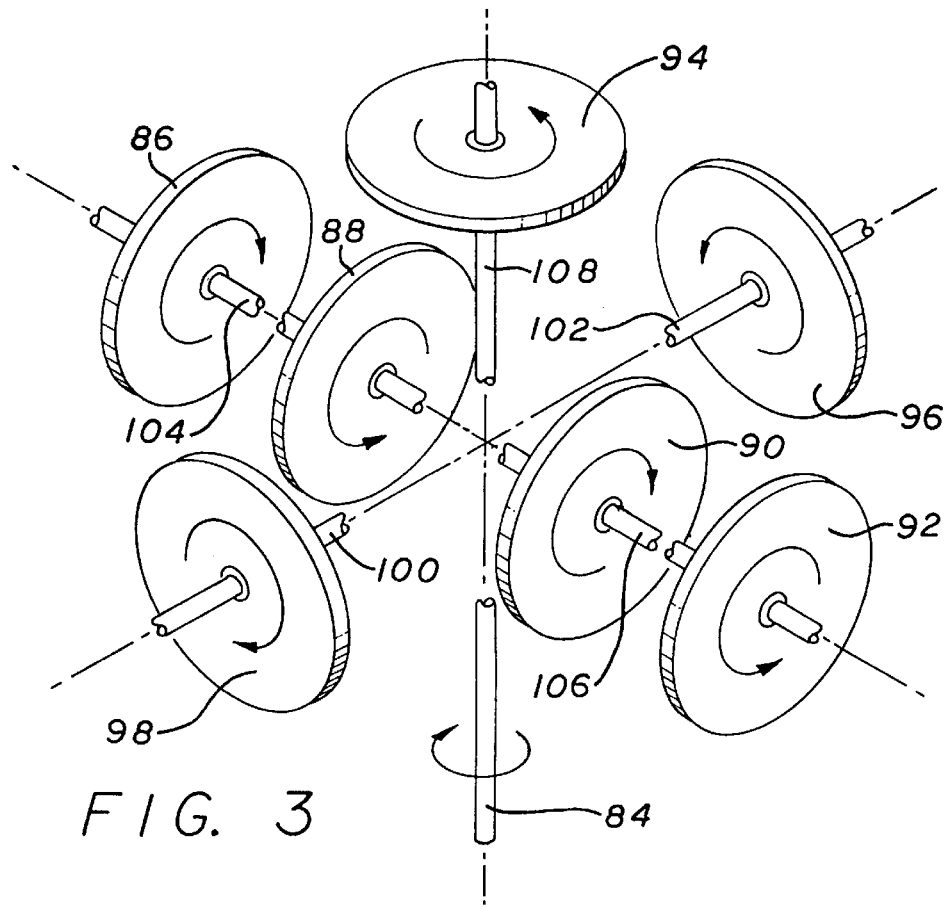
FIG. 3 is a schematic view of the mechanism of the invention illustrating the counterrotation of paired flywheels.

Before proceeding to a discussion of the arrangement of gears and shafts within the stabilizer casing 36, reference is made to FIG. 3 which presents a schematic view of the operation of the stabilizer 34 whereby stable axes are maintained through the gyroscopic effect of the rotations of flywheels about such axes. The vertical shaft 84, being coupled to the drive shaft 32 of the high speed motor 30, provides a rotation input that is translated, through the interactions of gears into rotations of predetermined senses of a pair of pitch axis-aligned driven shafts 100 and 102, a pair of roll axis-aligned driven shafts 104 and 106 and an azimuth aligned vertical driven shaft 108. The axis of the shaft 108 is coincident with the vertical shaft 84 and with the drive shaft 32 of the motor 30. As indicated on FIG. 3, the driven pitch axis shafts 100 and 102 counterrotate so that the flywheels 96 and 98, each fixed to a respective driven shaft, are thereby caused to counterrotate with respect to one another. The flywheel 94, which is fixed to the vertical driven shaft 108, counterrotates with respect to the vertical shaft 84.

The rotations about the roll (y) axis are more complex. The pairs of flywheels 86, 88 and 90, 92 are associated with the roll axis-aligned driven shafts 104 and 106, respectively. As shown, each pair of roll axis flywheels counterrotates. The "inner" flywheels 88 and 90 are fixedly engaged to the driven shafts 104 and 106 respectively and thus counterrotate with respect to one another in view of the counterrotations of the associated shafts. These rotations are reversed in the case of the "outer" flywheels 86 and 92 as journal bearings (not shown in FIG. 3) isolate the outer flywheels from the rotations of their supporting driven shafts. Gearing mechanisms (discussed below) convert shaft rotations whereby the outer flywheels 86 and 92 are caused to rotate both with respect to one another and with respect to the inner flywheels of the associated shafts.

The arrangement of counterrotating flywheels (or pairs of counterrotating flywheels) along the pitch and roll axes minimizes precessive interactions from external disturbances while maximizing rotating inertial mass to stabilize attached loads. In accordance with Newton's laws, each flywheel attempts to remain within its plane of rotation. The magnitude of the force resisting displacement from this plane is a function of the mass, speed and size (square of the radius) of the rotating flywheel. The total of six flywheels 86, 88, 90, 92, 96 and 98 that are mounted in the two horizontal, orthogonal axes of rotation make possible six times the stabilizing effect, with regard to disturbing moments about the vertical axis, of a single horizontal spin axis flywheel. It is well known to those skilled in the art that this result can be illustrated with reference to simple vector moment arm summation about the vertical axis.

The flywheel 94 arranged to spin about the azimuth provides additional stability against pitch or roll moments about the horizontal (x, y) axes. While only a single flywheel rotates about the azimuth due to space and packaging limitations, that flywheel, as well as the other six, serves to resist pitch and roll moments. A pitch or roll-disturbing moment is resisted by each flywheel in exactly the same manner as is yaw resisted about the azimuth, although the vector moment arm solutions differ. A roll moment disturbance about the y axis will be felt and resisted solely by the x axis and azimuth flywheels. The y axis flywheels do not resist as they are not forced by an out of plane-of-rotation moment. In other words, the disturbing moment lies within the plane of rotation of the y axis flywheels. This difference between the pitch/roll and the yaw stabilizing functions is negligible and follows from the fact that (1) the major important disturbances of suspended loads take place in the yaw (z) axis, (2) as the payload 12 lies below the stabilizer 34, the system's center of gravity is below the stabilizer 34, a factor providing built-in pitch/roll stability and (3) the combination of the top flywheel 94 and the six horizontal flywheels provides nearly the same amount of pitch/roll stability as yaw stability.

Assuming, for example, a yaw disturbance in the clockwise direction with respect to an observer above the stabilizer 34, both flywheels of the next axis will tend to precess downwardly in the direction of the z axis or azimuth if spinning clockwise relative to the drive cluster. The reverse situation occurs when the flywheels are spinning counterclockwise. Hence, the precession forces (moments) are cancelled out in the x axis flywheel pair. The same effect takes place in the y axis with double the amount of stabilizing resistance to yaw disturbances due to the presence of four counterrotating flywheels in that axis. The top flywheel 94 feels no disturbance, of course, as the yaw disturbance does not tend to force it out of its plane of rotation.

Pitch/roll disturbances are somewhat more complex to analyze, particularly in the case of those aligned with neither the x nor the y axis (e.g. 45 degrees therebetween). Simple vector analysis will show that the horizontal axis flywheels precessively (precession reaction) cancel one another leaving residual precession from the top flywheel 94. The residual force is negligible as the center of gravity lies below the gyro stabilizer 34 and the top flywheel 94 is only a small fraction of the total system mass.

Figure 4:
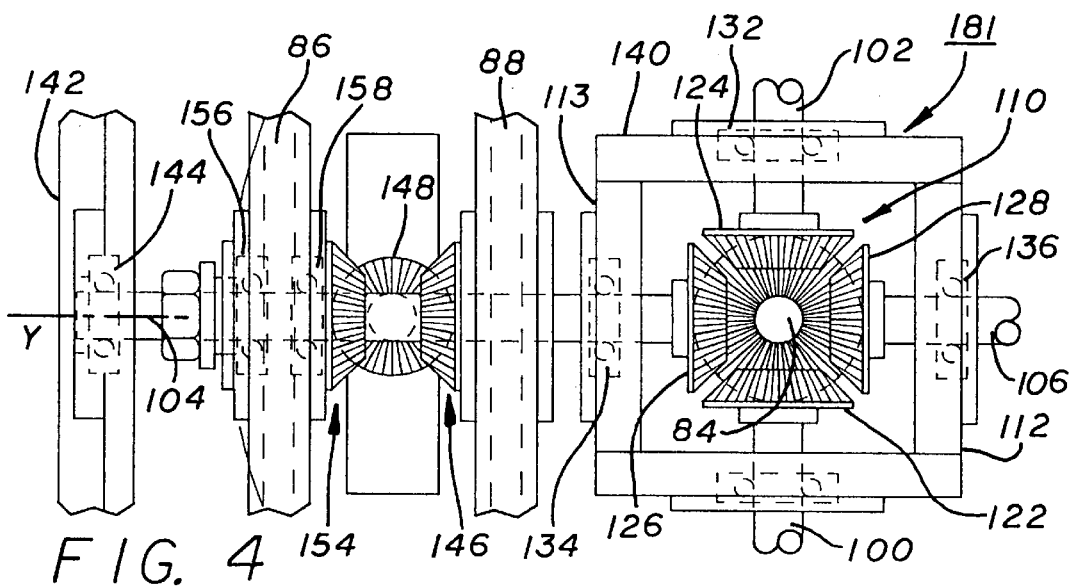
FIG. 4 is a detailed view of the mechanism of the invention for affecting counterrotation of paired flywheels.

The mechanisms for achieving the flywheel rotations of FIG. 3 will be understood with further reference to FIG. 4, a detailed top plan view illustrating mechanisms for affecting counterrotation of the paired flywheels 86, 88 of the roll or y axis. Referring to FIG. 4, as well as the more inclusive view of the interior of the stabilizer 34 detailed in FIG. 2, a bevel gear 110 is fixed to the upper end of the vertical drive shaft 84. The vertical shaft 84 is rotatably mounted with a desired vertical orientation within a vertical shaft support 181 by means of bearings 114, 116 within lower and upper horizontal shaft supports 118 and 120 respectively.

The bevel gear 110 provides means for translating rotation of the vertical shaft 84 into those of the driven shafts and associated flywheels as illustrated in FIG. 3. Again referring to FIGS. 3 and 4 in combination, the bevel gear 110 is arranged to mesh with pinion gears 122, 124, 126 and 128 fixed to the inner ends of the horizontal driven shafts 100, 102, 104 and 106 respectively. The driven shafts 100, 102, 104 and 106 are rotatably supported by bearings 130, 132, 134 and 136 that line apertures within the walls 138, 140, 113 and 112 respectively of the vertical shaft support, 181.

As is well understood, clockwise rotation of the bevel gear 110 at the top of the vertical drive shaft 84 (as viewed from above) will induce counterclockwise rotations of the meshing pinion gears 122, 124, 126 and 128 as each is viewed from its toothed side. The freely-rotatable drive shafts attached to the pinion gears transmit these rotations as illustrated in FIG. 3. The counterrotations of the aligned pairs of horizontal driven shafts 100, 102 and 104, 106 result from the fact that the orientations of the pinion gears fixed to the inner ends of each pair of aligned shafts are 180 degrees removed from one another. Thus, for example, while each of the gears 122 and 124 rotates counterclockwise, the driven shafts 100 and 102 counterrotate with respect to one another as shown in FIG. 3.

Returning to FIG. 4, rotation of the y-axis shaft 104 is directly transformed into counterclockwise rotation of the inner flywheel 88 fixed thereto. The remote or outer end of the shaft 104 is rotatably received within a bearing 144 in a side wall 142 of the stabilizer casing 36. An idler gear assembly located along the shaft 104 between the inner flywheel 88 and the outer flywheel 86 imparts counterrotation to the outer flywheel 86 with respect to the inner flywheel 88. The idler gear assembly consists of a pinion gear 146 fixed to the high speed rotating shaft 104 at the outer side of the inner flywheel 88. The gear 146 is arranged to mesh with a freely-rotatable bevel gear 148 fixed to a shaft 150 that is supported by bearings (not shown) within a vertical support 152.

A complementary pinion gear 154 is similarly arranged to mesh with the bevel gear 148. The non-toothed surface of the pinion gear 154 is fixedly engaged to the outer flywheel 86. Unlike the pinion gear 146, the complementary pinion gear 154 is not fixed to the driven shaft 104. Rather, clearance is provided between the interior of the pinion gear 154 and the driven shaft 104. The outer flywheel 86, to which the pinion gear 154 is fixed, is isolated from rotation of the driven shaft 104 by means of interior bearings 156, 158.

It is well-known that an idler gear assembly as shown affects the counterrotation of a remote gear (pinion gear 154) with respect to a driven proximate gear (pinion gear 146). As the sense of rotation of the pinion gear 146 is that of the inner flywheel 88 while the outer flywheel 86 is fixed to and rotatable with the pinion gear 154, it is seen that the desired counterrotation of the outer flywheel with respect to the inner flywheel along the driven shaft 104 portion of the y or pitch axis is thus accomplished. Like structures result in the counterrotation of the flywheels 106 and 92 along the aligned driven shaft 106 of the roll axis.

Initial gyro run-up is assisted by an externally powered hand-held high speed drive unit which adapts to a drive socket located on one of the outside horizontal flywheel shaft bearing ports. This relieves the expenditure of excessive battery energy during run-up, thus extending effective battery power reserve. FIG. 5 is a side elevation view, partly in section, that illustrates the start-up configuration of the invention whereby a portable drive unit 160 may be employed to impart initial excitation of the stabilizer 34. As indicated, the unit 160 includes an output shaft 164 that typically terminates in a Phillips-type drive head 166. The unit 160 may comprise, for example, a commercially-available, hand-held, externally powered (e.g., a.c. or aircraft utility power) variable speed, high r.p.m. drill-type device. A representative device may possess an output power range of 0.25 to 0.33 h.p. and a variable speed of up to 15,000 r.p.m. (i.e., the operating speed of the drive motor 30). The output shaft 164 may comprise a No. 160 Phillips type bit fitted onto a drill chuck mounted to the unit 160. In operation, the output shaft 164 couples to a drive adapter socket associated with the stabilizer 34. The adapter socket may be formed within a face 168 of an extreme end of, for example, the driven shaft 104. The face 168 and associated adapter socket are accessible to the drive head 166 of the unit 160 through an aperture 170 within a wall 172 of the stabilizer casing. Such aperture is located adjacent the extreme face 168 of the driven shaft 104 within a bearing block 174 and is in alignment with the axis of the driven shaft 104.

FIG. 6 is a perspective view of the drive adapter socket and associated assemblies of the invention. The aperture 170 is of generally square shape. The drive adapter socket 176 comprises an orthogonal pair of intersecting grooves within the extreme face 168 of the driven shaft 104. A spring-loaded weather cover 178 is arranged to overlie the aperture 170. The weather cover 178 is spring-biased to close over the aperture 170 after run-up and the output shaft 164 of the unit 160 has been disengaged from the socket 176. Upon closure of the weather cover 178, an O-ring seal 180 at the inner side of the cover 178 seals the driven shaft 104 from moisture and/or dust.

Thus, it can be seen that the stabilization of axes and cancellation of undesired precessive moments is accomplished by apparatus configured in accordance with the preferred embodiment of the invention. By employing the stabilizer of the invention within a system in which a payload and associated apparatus is fixedly engaged therebelow, one may see that gyroscopic stabilization is accomplished which is translated into stabilization of the attitude and position of the payload below. By employing the teachings of this invention, one may thus realize the numerous advantages that result from the precise and reliable control and positioning of suspended payloads. As discussed above, numerous applications may be greatly enhanced in quality and utility through the use of the stabilization system of the invention. The stabilizer system of the invention can be readily modified to accommodate various flywheel sizes and masses to thereby match specific payload size/weight requirements.

While this invention has been described with reference to its presently preferred embodiment, it is not limited thereto. Rather, this invention is limited only insofar as it is defined by the following set of patent claims and includes within its scope all equivalents thereof.

What is claimed is:

1. Apparatus for stabilizing a suspended load comprising, in combination:
   a) means engaged to said load;
   b) said means including a plurality of flywheels;
   c) said plurality of flywheels being arranged along each of a set of three orthogonal space axes;
   d) means for driving said flywheels; and
   e) said flywheels being arranged so that precession forces responsive to the input of disturbances are substantially cancelled.

2. Apparatus as defined in claim 1 wherein said means engaged to said load is located above said load.

3. Apparatus as defined in claim 2 wherein said means engaged to said load further includes:
   a) a motor for driving a rotatable output shaft, said motor being engaged to a first end of said output shaft;
   b) at least one rotatable driven shaft aligned along each of said orthogonal axes;
   c) a flywheel being fixed to each of said shafts; and
   d) means for coupling rotation of said output shaft of said motor to each of said driven shafts.

4. Apparatus as defined in claim 3 further characterized in that:
   a) said output shaft of said motor is substantially vertical; and
   b) one of said driven shafts is vertical and coaxial with said output shaft.

5. Apparatus as defined in claim 4 wherein said means for coupling further comprises:
   a) a gear fixed to the second, opposed end of said output shaft;
   b) a gear fixed to each of said driven shafts; and
   c) said shafts are so arranged that said gears interact to transfer rotation of said output shaft to said driven shafts.

6. Apparatus as defined in claim 5 wherein said driven shafts further comprise:
   a) said vertical driven shaft;
   b) four horizontal driven shafts;
   c) two of said horizontal driven shafts being aligned along a first horizontal axis and two of said horizontal driven shafts are aligned along a second horizontal axis; and
   d) said first horizontal axis is orthogonal to said second horizontal axis.

7. Apparatus as defined in claim 6 wherein said horizontal driven shafts are arrayed symmetrically about said vertical axis comprising said output shaft and said vertical driven shaft whereby the axes of rotation of said horizontal driven shafts intersect at a common point.

8. Apparatus as defined in claim 7 wherein:
   a) the vertical axis defined by said output shaft and said vertical driven shaft intersects said common point; and
   b) said gears are arrayed so that said axially-aligned shafts counterrotate with respect to one another in response to rotation of said output shaft.

9. Apparatus as defined in claim 8 further characterized in that:
   a) a bevel gear is fixed to said second end of said output shaft;
   b) a pinion gear is fixed to an end of each of said horizontal driven shafts; and
   c) a bevel gear is fixed to an end of said vertical driven shaft so that said gears interact with one another.

10. Apparatus as defined in claim 9 wherein said shafts and flywheels are enclosed within a cube-shaped casing.

11. Apparatus as defined in claim 10 wherein the opposed end of each of said driven shafts is rotatably mounted within a predetermined wall of said casing.

12. Apparatus as defined in claim 11 wherein a first inner flywheel and a second outer flywheel are rotatably mounted along each of at least one aligned pair of horizontal driven shafts.

13. Apparatus as defined in claim 12 wherein each of said second outer flywheels includes means for generating counterrotation with respect to the associated driven shaft.

14. Apparatus as defined in claim 13 wherein said means for generating counterrotation additionally includes:
   a) a bearing for isolating said second flywheel from rotation of said driven shaft; and
   b) means engaged to said first inner flywheel and fixed to said driven shaft for driving said second outer flywheel to counterrotate with respect to said driven shaft.

15. Apparatus as defined in claim 14 wherein said means for driving said second outer flywheel to counterrotate further includes:
   a) a gear fixed to said first inner flywheel and to said driven shaft;
   b) a gear fixed to said second outer flywheel; and
   c) means engaged to each of said gears fixed to said first inner flywheel and to said second outer flywheel for transmitting rotation therebetween.

16. Apparatus as defined in claim 15 wherein:

a) said gear fixed to said flywheel and to said driven shaft is a first bevel gear;

b) said gear fixed to said second flywheel is a second bevel gear; and c) said means for transmitting is an idler gear.

17. Apparatus as defined in claim 11 further including means for engaging a rotatable output shaft of a starter unit so that said rotation is transferred to said flywheels.

18. Apparatus as defined in claim 17 wherein said means for engaging comprises:

a) a wall of said casing having an aperture substantially in alignment with the axis of rotation of the driven shaft received therein; and b) means for coupling said driven shaft to said rotatable output shaft of said starter unit.

19. Apparatus as defined in claim 18 wherein said means for coupling comprises an adapter socket.

20. Apparatus as defined in claim 19 wherein said adapter socket comprises an indentation in said face of said driven shaft.

21. Apparatus as defined in claim 20 further including:

a) a spring-loaded cover; and b) said cover is mounted to the exterior of said casing wall for selectively covering said aperture.

* * * * *